(12) United States Patent
Ball et al.

(10) Patent No.: US 12,215,806 B2
(45) Date of Patent: Feb. 4, 2025

(54) CONDUIT COUPLING DEVICES, SYSTEMS FOR COUPLING CONDUITS TOGETHER, AND METHODS OF COUPLING CONDUITS

(71) Applicant: The Boeing Company, Arlington, VA (US)

(72) Inventors: Austin B. Ball, Seattle, WA (US); Jonathan Y. Ahn, Seattle, WA (US); Christopher R. Brown, Seattle, WA (US); Shane E. Arthur, Kirkland, WA (US); Joseph D. Anderson, Olalla, WA (US); Ricardo A. Fritzke, Sammamish, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/354,539

(22) Filed: Jul. 18, 2023

(65) Prior Publication Data

US 2024/0255079 A1    Aug. 1, 2024

Related U.S. Application Data

(60) Provisional application No. 63/481,994, filed on Jan. 27, 2023.

(51) Int. Cl.
*F16L 23/00* (2006.01)
*F16L 23/04* (2006.01)

(52) U.S. Cl.
CPC ............ *F16L 23/003* (2013.01); *F16L 23/04* (2013.01)

(58) Field of Classification Search
CPC ......... F16L 23/06; F16L 23/04; F16L 23/003; F16L 23/006; F16L 23/02; F16L 23/024; F16L 23/032; F16L 47/14; F16L 25/12; F16L 55/172; F16L 55/1725
USPC ....................................... 285/24, 26, 28, 29
See application file for complete search history.

(56) References Cited

U.S. PATENT DOCUMENTS

2021/0172268 A1*  6/2021  Westgarth ............... F16L 21/06

* cited by examiner

*Primary Examiner* — Aaron M Dunwoody
(74) *Attorney, Agent, or Firm* — Kolitch Romano Dascenzo Gates LLC

(57) ABSTRACT

Conduit coupling devices comprise a body configured to be selectively attached to engage an outer surface of a conduit; and an elongate connecting member extending from the body or configured to selectively extend from the body. Systems comprise at least two conduit coupling devices. Methods comprise attaching a first conduit coupling device to a first conduit; attaching a second conduit coupling device to a second conduit; operatively attaching the first conduit coupling device to the second conduit coupling device; translating the first conduit coupling device and the second conduit coupling device toward each other to operatively position the first conduit relative to the second conduit; and clamping the first conduit to the second conduit.

21 Claims, 12 Drawing Sheets

CONDUIT COUPLING DEVICES, SYSTEMS FOR COUPLING CONDUITS TOGETHER, AND METHODS OF COUPLING CONDUITS

RELATED APPLICATION

The present application is a non-provisional of and claims priority to U.S. Provisional Patent Application No. 63/481,994, filed on Jan. 27, 2023, entitled "CONDUIT COUPLING DEVICES, SYSTEMS FOR COUPLING CONDUITS TOGETHER, AND METHODS OF COUPLING CONDUITS," the complete disclosure of which is incorporated by reference.

FIELD

The present disclosure relates to conduit coupling devices, systems for coupling conduits together, and methods of coupling conduits.

BACKGROUND

Manufacturing technicians and mechanics are often required to access confined spaces for installation and/or maintenance of parts, such as with the manufacturing or maintenance of large machinery, vehicles, watercraft, aircraft, spacecraft, etc. Such confined spaces are often difficult to reach with two hands, while also providing a line of sight for the technician or mechanic. One particular example is the coupling of conduits together within a confined space. In this example, a technician or mechanic must align the conduits, bring the conduits into operative engagement, and install a clamp around the conduits with only one hand. Thus, there is a need for devices to assist with the installation and maintenance of conduits within confined spaces.

SUMMARY

Conduit coupling devices, systems for coupling conduits together, and methods of coupling conduits are disclosed.

Conduit coupling devices comprise a body that is configured to selectively engage an outer surface of a conduit, and an elongate connecting member that extends from the body or that is configured to selectively extend from the body. The elongate connecting member is configured to be selectively attached to a second conduit coupling device to facilitate translation of the body and the second conduit coupling device toward each other.

Systems for coupling conduits together comprise at least two conduit coupling devices.

Methods of coupling conduits comprise attaching a first conduit coupling device to a first conduit, attaching a second conduit coupling device to a second conduit, operatively attaching the first conduit coupling device to the second conduit coupling device, translating the first conduit coupling device and the second conduit coupling device toward each other to operatively position the first conduit relative to the second conduit, and clamping the first conduit to the second conduit.

DESCRIPTION

Figure 1:
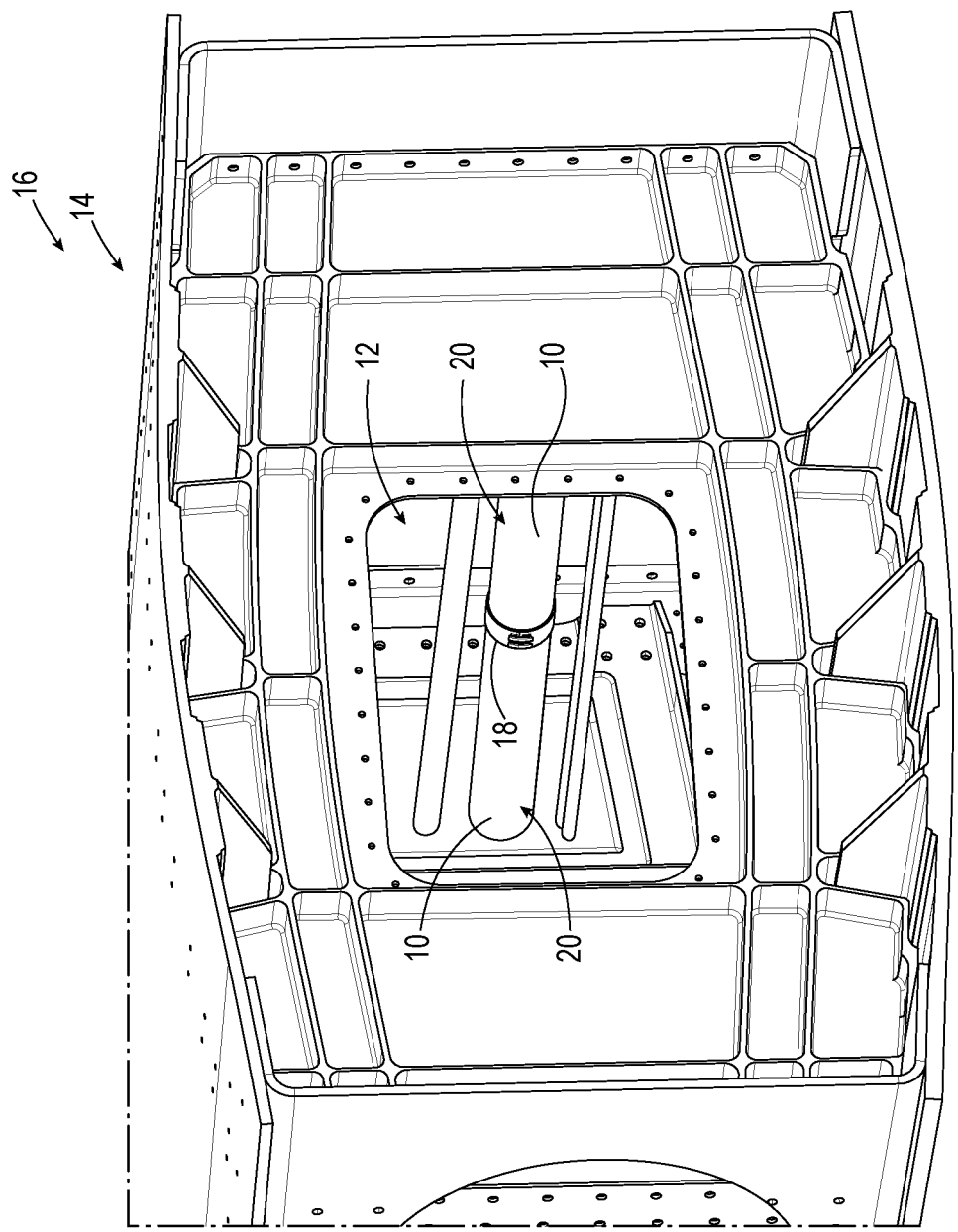
FIG. 1 is a perspective view of a portion of an example aircraft wingbox, showing two fuel lines coupled together.

In the aerospace industry, due to advances in materials, wings are getting skinnier and skinnier, while still needing to house various systems, including hydraulic and fuel systems. For example, FIG. 1 illustrates a portion of a wingbox 14 of an aircraft 16 having a confined space 12, through which a series of conduits extend, including a fuel line 20. The fuel line 20 comprises at least two conduits 10 clamped together by a clamp 18. During installation of the fuel line 20, a technician must access the confined space 12 with a single hand, translate the two conduits 10 toward each other, align the two conduits 10 with each other, and secure the two conduits together with the clamp 18. Such a task is difficult and time consuming.

Figure 2:
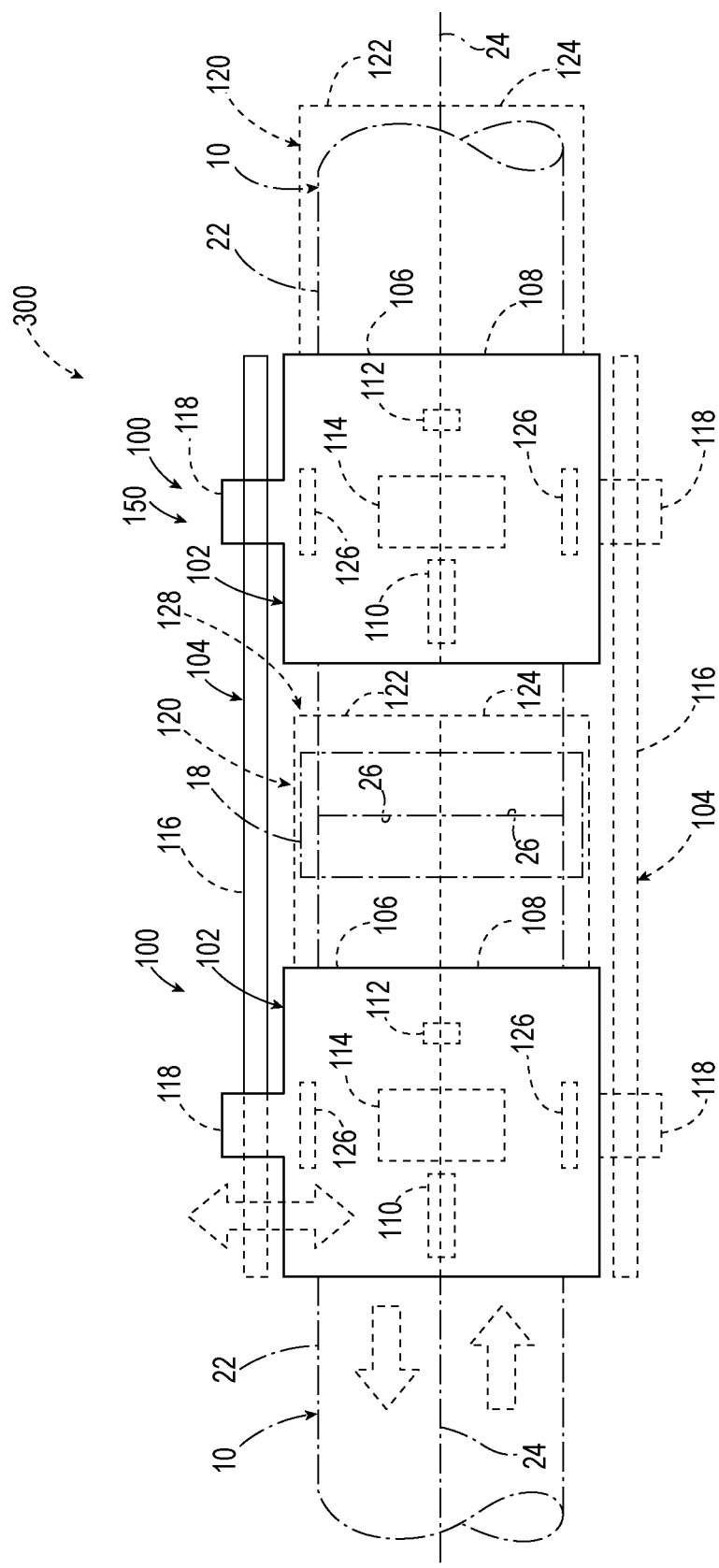
FIG. 2 is a schematic illustration representing conduit coupling devices and systems for coupling conduits together.

FIG. 2 schematically represents conduit coupling devices 100 and systems 300 for coupling conduits together, such as in connection fuel lines extending through a wingbox of an aircraft. However, conduit coupling devices 100 and systems 300 are not limited to be used in connection with aircraft fuel lines.

Generally, in FIG. 2, elements that are likely to be included in a given example are illustrated in solid lines, while elements that are optional to a given example are illustrated in broken lines. Optional elements of conduit coupling devices 100 are illustrated in dashed lines, and environment is illustrated in dash-dot lines. However, elements that are illustrated in solid lines are not essential to all examples of the present disclosure, and an element shown in solid lines may be omitted from a particular example without departing from the scope of the present disclosure. Moreover, environmental elements illustrated in dash-dot lines may be considered components of a system 300.

Two conduit coupling devices 100 are schematically represented in FIG. 2 in solid lines. As shown in FIG. 2 at left, at least one of the two conduit coupling devices 100 generally comprises at least a body 102 and an elongate connecting member 104. The body 102 of a conduit coupling device 100 is configured to selectively engage an outer surface 22 of a conduit 10. The elongate connecting member 104 of a conduit coupling device 100 either extends from the body 102 or is configured to selectively extend from the body 102. That is, in some examples, the elongate connecting member 104 may be integral with the body 102, while in other examples, the elongate connecting member 104 may be configured to be selectively attached to and detached from the body 102. In particular, the elongate connecting member 104 is configured to be selectively attached to a second conduit coupling device 150 (or at least a body 102 of a second conduit coupling device 150), shown at right, to facilitate alignment of the two bodies 102 and thus the alignment of the corresponding conduits 10. Moreover, the elongate connecting member 104 facilitates the translation of the two bodies 102 (and thus the corresponding conduits 10) toward each other.

The conduits 10 may take any suitable configuration and generally may be described as having longitudinal axes 24 that need to be substantially aligned with each other and also having end faces 26 that need to be brought together and optionally into engagement with each other for operative clamping of the two conduits 10 together. For example, the conduits 10 may form a fuel line 20, such as discussed above in connection with FIG. 1. Conduits 10 may have various shapes and sizes, but typically may be cylindrical. Conduit coupling devices 100 therefore may have any suitable size to correspond to respective conduit sizes. Additionally or alternatively, some conduit coupling devices may be sized to fit more than one size of conduit 10.

Accordingly, conduit coupling devices 100 facilitate the alignment of the longitudinal axes 24 of two adjacent conduits 10 when a user operatively attaches the elongate connecting member 104 from one conduit coupling device 100 to another.

As schematically illustrated in FIG. 2, in some examples, the body 102 of a conduit coupling device 100 comprises a first portion 106 and a second portion 108 that is configured to be selectively moved relative to the first portion 106 to engage the outer surface 22 of a conduit 10. In particular, the body 102 is configured to facilitate attachment of the body 102 to the outer surface 22 of a conduit 10. In some such examples, the second portion 108 is hinged to the first portion 106. That is, as schematically represented in FIG. 2, in some examples, the first portion 106 and the second portion 108 collectively define a hinge 110 that is configured to permit for the selective separation and the selective coming together of the first portion 106 and the second portion 108. Accordingly, in such examples, the body 102 may be hinged opened to be placed around the outer surface 22 of a conduit 10 and then hinged closed to engage the outer surface 22 of the conduit 10.

As also schematically illustrated in FIG. 2, in some examples, the first portion 106 or the second portion 108 of the body 102 defines a detent 112 that is configured to resist but also permit separation of the first portion 106 and the second portion 108, such as in a direction aligned with the hinge 110. In particular, in some examples, the first portion 106 and the second portion 108 are configured to be hinged between open and closed configurations and also are configured to be completely separated from each other. Accordingly, in confined spaces, such as the confined space 12 of FIG. 1, removal of such a conduit coupling device 100 from a conduit 10 may be facilitated by translating the first portion 106 and the second portion 108 away from each other generally parallel to the longitudinal axis 24 of the conduit 10 to which it is attached. In some such examples, the detent 112 maintains the hinge 110 in an operative state until a user overcomes the friction of the detent 112 to separate the first portion 106 and the second portion 108.

As schematically illustrated in FIG. 2, some conduit coupling devices 100 further comprise a clasp 114 that is configured to operatively secure the first portion 106 to the second portion 108 (i.e., in a closed configuration) and to selectively restrict movement of the second portion 108 relative to the first portion 106. In other words, the clasp 114 is used to secure the body 102 to the outer surface 22 of a conduit 10 once the first portion 106 and the second portion 108 are hinged to the closed configuration. To remove such a conduit coupling device 100 from a conduit 10, the clasp 114 is opened, and the first portion 106 and the second portion 108 may be hinged apart in examples that comprise a hinge 110 and/or may be translated away from each other in examples where hinge 110 is so configured.

In some examples, the elongate connecting member 104 is configured to be selectively translated relative to the body 102 of the conduit coupling device 100. Accordingly, the elongate connecting member 104 may be adjusted relative to the body 102, such as to be extend into operative position for attachment to an adjacent conduit coupling device 100, or at least to a body 102 thereof.

As an illustrative example, the elongate connecting member 104 may comprise a ratchet strap 116. In such examples, the body 102 comprises a ratchet buckle 118 that is configured to operatively receive the ratchet strap 116 and that is configured to selectively restrict and selectively permit translation of the ratchet strap 116 through the ratchet buckle 118. Accordingly, during use, a user, optionally with one hand, may adjust the position of the ratchet strap 116 relative to the body 102 so as to extend the ratchet strap 116 toward an adjacent second conduit coupling device 150 and to be operatively coupled to the ratchet buckle 118 of the second conduit coupling device 150. As a result, the two bodies 102 of the two conduit coupling devices 100 will be aligned, thereby aligning, or aiding in the aligning of, the longitudinal axes 24 of the conduits 10.

In some examples, as schematically and optionally represented in FIG. 2, the conduit coupling device 100 further comprises a second elongate connecting member 104 that extends from the body 102 or that is configured to selectively extend from the body 102. When present, the second elongate connecting member 104 is configured to be selectively attached to the second conduit coupling device 150 (e.g., the body 102 thereof) to facilitate alignment of the body 102 and the second conduit coupling device 150. Additionally or alternatively, the second elongate connecting member 104 may be considered a component of (i.e., may initially extend from or be positioned to extend from) the second conduit coupling device 150. In some examples, two elongate connecting members 104 are positioned on opposing sides of the body 102. Such a configuration serves to restrict the misalignment and/or binding of the two bodies 102 of the adjacent conduit coupling devices 100 when being translated toward each other.

In such examples when the body 102 comprises a first portion 106 and a second portion 108, one elongate connecting member 104 may extend from the first portion 106 while the other elongate connecting member 104 may extend from the second portion 108. In such examples where the two elongate connecting members 104 each comprise a ratchet strap 116, the first portion 106 of the body 102 comprises a first ratchet buckle 118, and the second portion 108 of the body 102 comprises a second ratchet buckle 118 that is configured to operatively receive the second ratchet strap 116. The second ratchet buckle 118 is configured to selectively restrict and selectively permit translation of the second ratchet strap 116 through the second ratchet buckle 118.

With continued reference to FIG. 2, some conduit coupling devices 100 further comprise an extension 120 that extends from the body 102 and that is configured to extend only partially around and spaced-apart from the outer surface 22 of the conduit 10 when the body 102 is operatively attached to the outer surface 22 of the conduit 10. The extension 120 may be described as an extension of the body 102 that does not fully circumscribe a full extent of the body 102 and thus does not fully circumscribe a conduit 10 when the body 102 is attached to the outer surface 22 thereof. When present, the extension 120 provides structure that engages a clamp 18 during installation. In particular, the extension 120 aids in guiding the clamp 18 around two conduits 10 operatively positioned adjacent each other. That is, a user may insert a clamp 18 between the conduits 10 and the extension 120, and translate the clamp 18 toward the extension 120, which in turn will cause the clamp 18 to be fed around the conduits 10, facilitating the user's operative attachment of the clamp 18 to the conduits 10.

In some such examples, when the body 102 of a conduit coupling device 100 comprises a first portion 106 and a second portion 108, the extension 120 may comprise an extension first portion 122 extending from the first portion 106 of the body 102 and an extension second portion 124 extending from the second portion 108 of the body 102. Thus, in examples where the first portion 106 and the second portion 108 of the body 102 are hinged, the extension first portion 122 and the extension second portion 124 will pivot relative to each other when the first portion 106 and the second portion 108 are moved relative to each other, such as to install the body 102 on an outer surface 22 of a conduit 10.

As schematically and optionally illustrated in FIG. 2, in some examples of conduit coupling devices 100, the body 102 comprises one or more pads 126 that are configured to engage the outer surface 22 of the conduit 10 to restrict translation of the body 102 relative to the outer surface 22 of the conduit 10 when the body 102 is operatively attached to the outer surface 22 of the conduit 10. Any suitable number and shape of pads 126 may be utilized, and the pads 126 may be constructed of any suitable material, such as one that provides a non-slip friction interface with the outer surface 22 of a conduit 10. Additionally or alternatively, the one or more pads 126 may be compressible to permit a given conduit coupling device 100 to engage conduits 10 of difference sizes, such as different diameters. That is, the presence of one or more pads 126 may configure and permit a conduit coupling device 100 to be used with more than one size of conduit 10.

With continued reference to FIG. 2, systems 300 for coupling conduits 10 together comprise at least two conduit coupling devices 100. Systems 300 also may further comprise one or more clamps 18.

Turning now to FIGS. 3-11, an illustrative non-exclusive example of a system 300 is illustrated in the form of system 302. Where appropriate, the reference numerals from the schematic illustration of FIG. 2 are used to designate corresponding parts of system 302; however, the example of FIGS. 3-11 are non-exclusive and do not limit conduit coupling devices 100 and systems 300 to the illustrated embodiments of system 302. That is, conduit coupling devices 100 and systems 300 are not limited to the specific embodiments of the illustrated system 302, and conduit coupling devices 100 and systems 300 may incorporate any number of the various aspects, configurations, characteristics, properties, etc. of conduit coupling devices 100 and systems 300 that are illustrated in and discussed with reference to the schematic representations of FIG. 1 and/or the embodiments of FIGS. 3-11, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to system 302; however, it is within the scope of the present disclosure that the previously discussed features, variants, etc. may be utilized with system 302.

System 302 is an example of a system 300 that comprises two conduit coupling devices 100 with identical bodies 102 and collectively having two elongate connecting members 104 in the form of ratchet straps 116. Each body 102 comprises a first portion 106 and a second portion 108 that are hinged together by a hinge 110, as well as an extension 120 with an extension first portion 122 and an extension second portion 124. Each of the first portion 106 and the second portion 108 comprise a ratchet buckle 118. In particular, the example ratchet buckles 118 of system 302 comprise a release button that when engaged selectively permits translation of a corresponding ratchet strap 116 in a reverse direction (i.e., a direction toward which the short faces of the ratchet barbs face).

Figure 4:
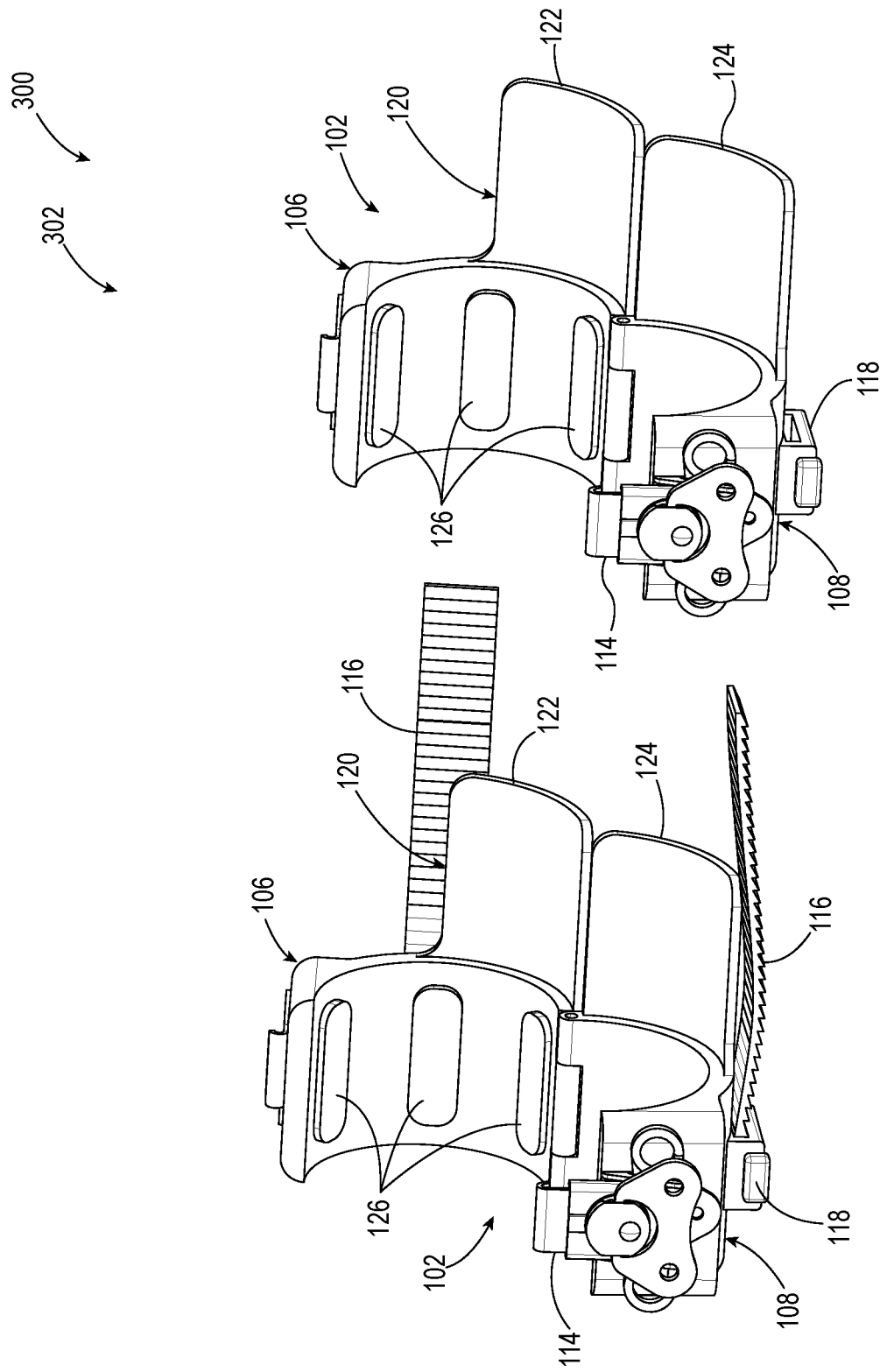
FIG. 4 is a perspective view of the conduit coupling devices of FIG. 3 shown in open configurations.

The first portion 106 of the bodies 102 comprises pads 126, as perhaps best seen in FIG. 4. Each conduit coupling device 100 of system 302 comprises a clasp 114 for operatively coupling together the first portion 106 and the second portion 108 when operatively positioned around a conduit 10.

Figure 3:
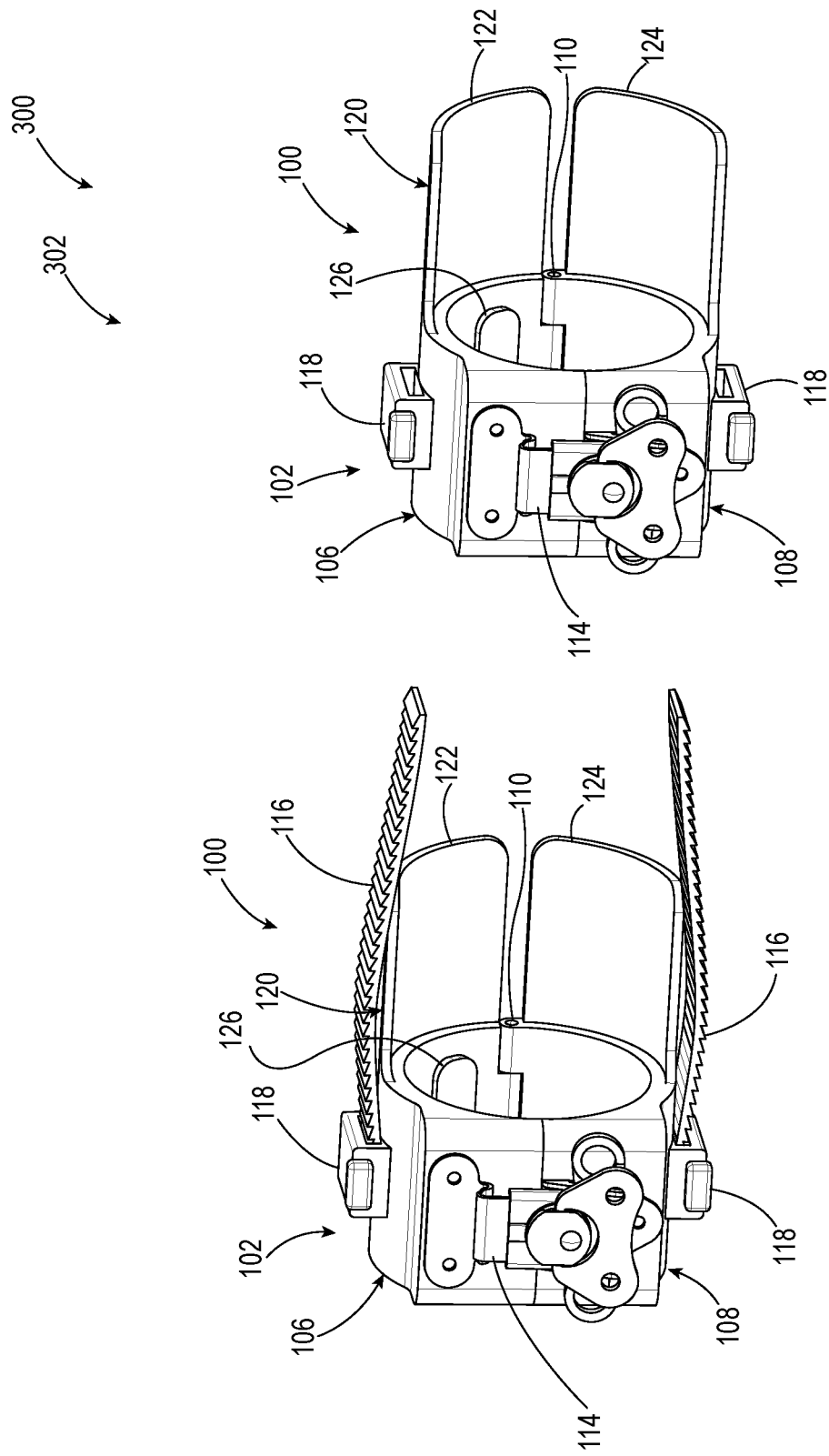
FIG. 3 is a perspective view two example conduit coupling devices shown in closed configurations.
Figure 5:
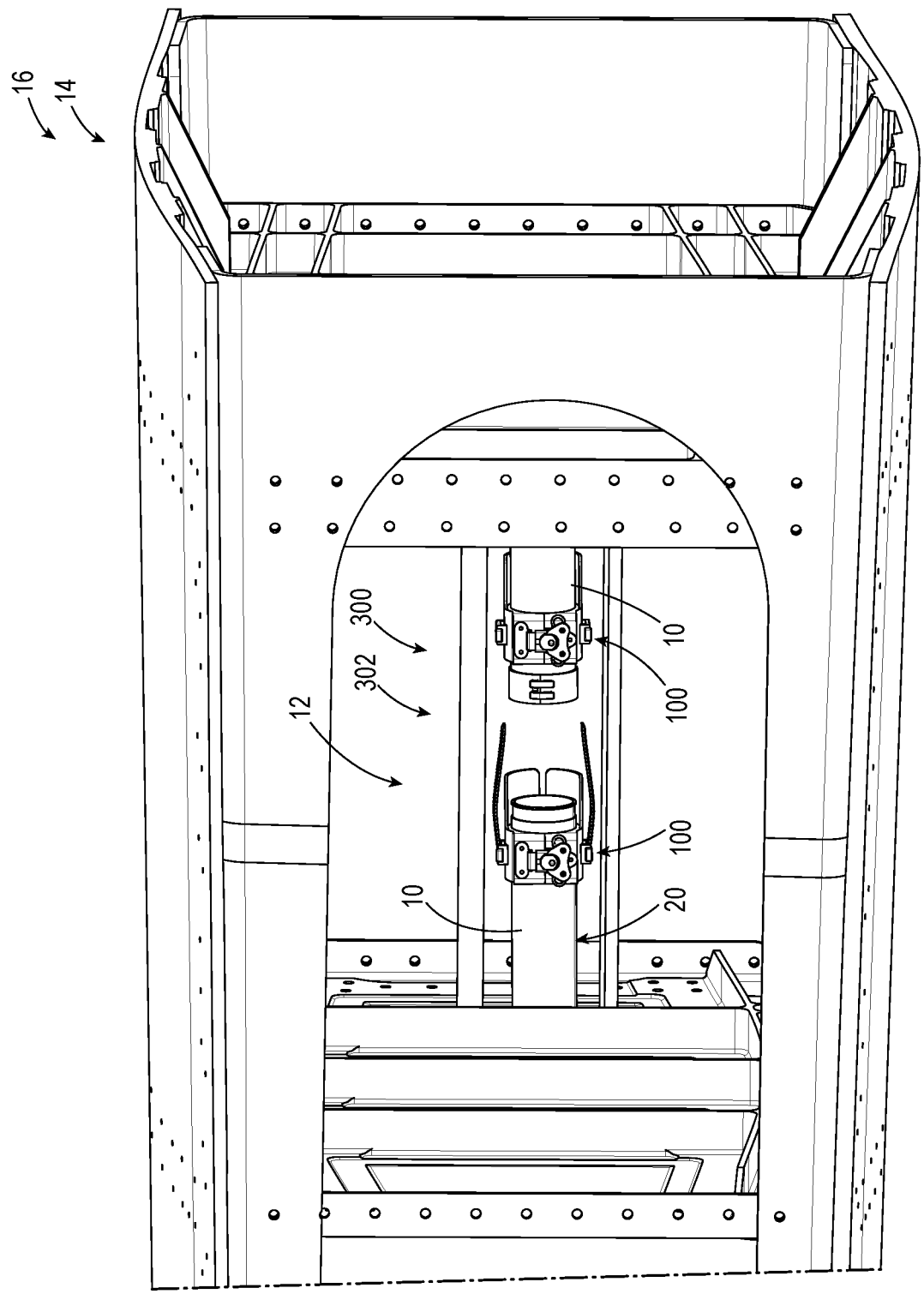
FIG. 5 is a perspective view of a portion of an example aircraft wingbox, shown with the conduit coupling devices of FIG. 3 attached to two fuel line conduits and inserted into the aircraft wingbox for coupling together.

FIG. 3 illustrates the two conduit coupling devices of system 302 in closed configurations, while FIG. 4 illustrates the two conduit coupling devices of system 302 in open configurations, such as to permit for installation on corresponding conduits 10. As illustrated in FIG. 5, the two conduit coupling devices 100, once operatively installed on corresponding conduits 10, may be inserted into a confined space 12, such as (but not limited to) a wingbox 14 of an aircraft 16. In FIGS. 3-5, both ratchet straps 116 are illustrated as being initially coupled to the body 102 one of the two conduit coupling devices 100 so as to facilitate insertion of the ratchet straps 116 into the ratchet buckles 118 of the body 102 of the other of the two conduit coupling devices 100 without having to engage the release button of the rachet buckles 118 of the other of the two conduit coupling devices 100. However, it is within the scope of the present disclosure that one ratchet strap 116 may be initially coupled to one body 102 while the other ratchet strap is initially coupled to the other body 102. Moreover, the ratchet buckles 118 of the first portions 106 of the bodies 102 may be configured for operative translation of ratchet straps 116 in a first direction (i.e., without engagement of the release buckle), while the ratchet buckles 118 of the second portions 108 of the bodies 102 may be configured for operative translation of ratchet straps 116 in a second, opposite direction.

Figure 6:
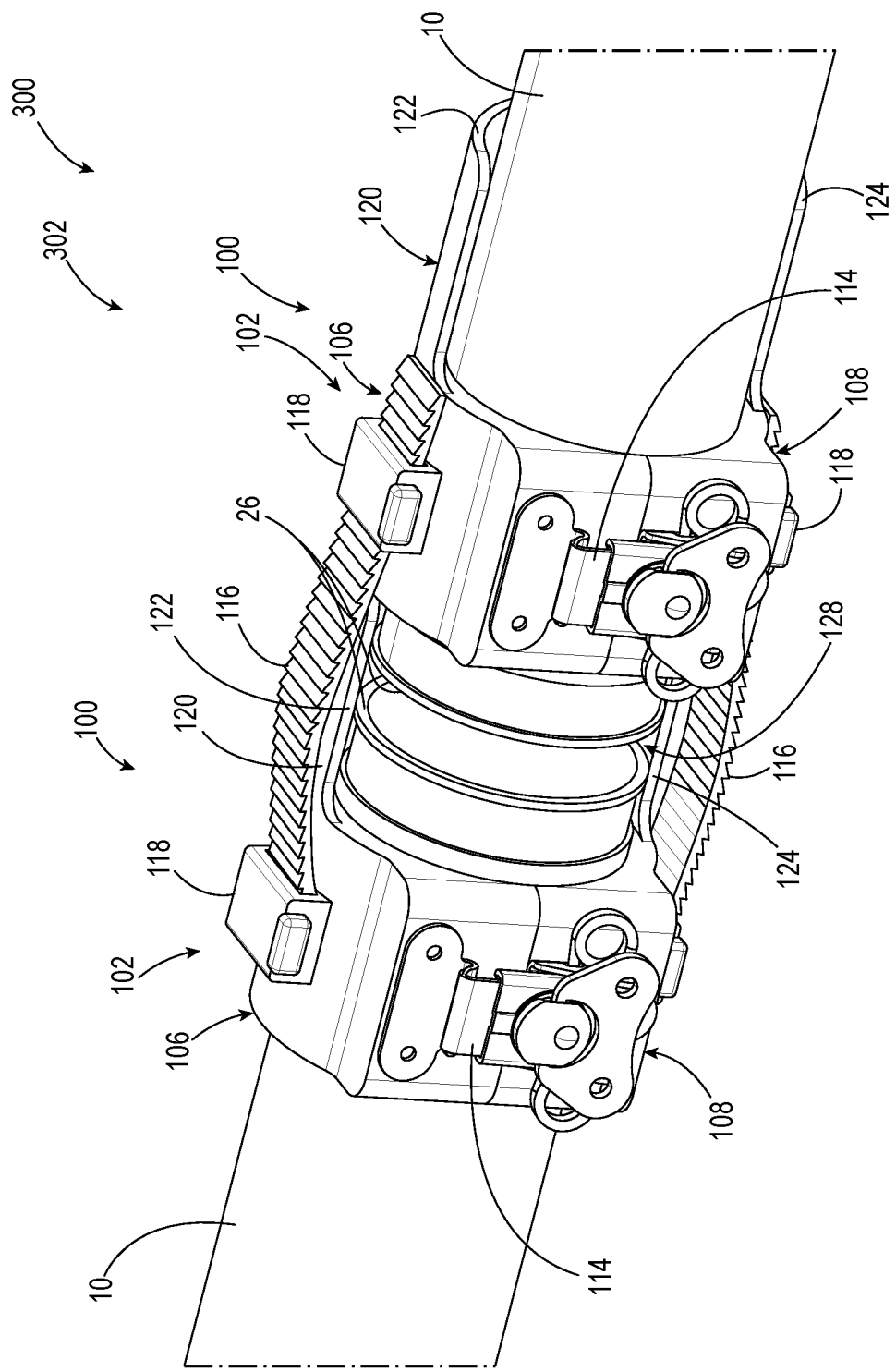
FIG. 6 is a perspective view of the conduit coupling devices of FIG. 3 shown attached to two conduits and positioned for translating the two conduits toward each other.
Figure 7:
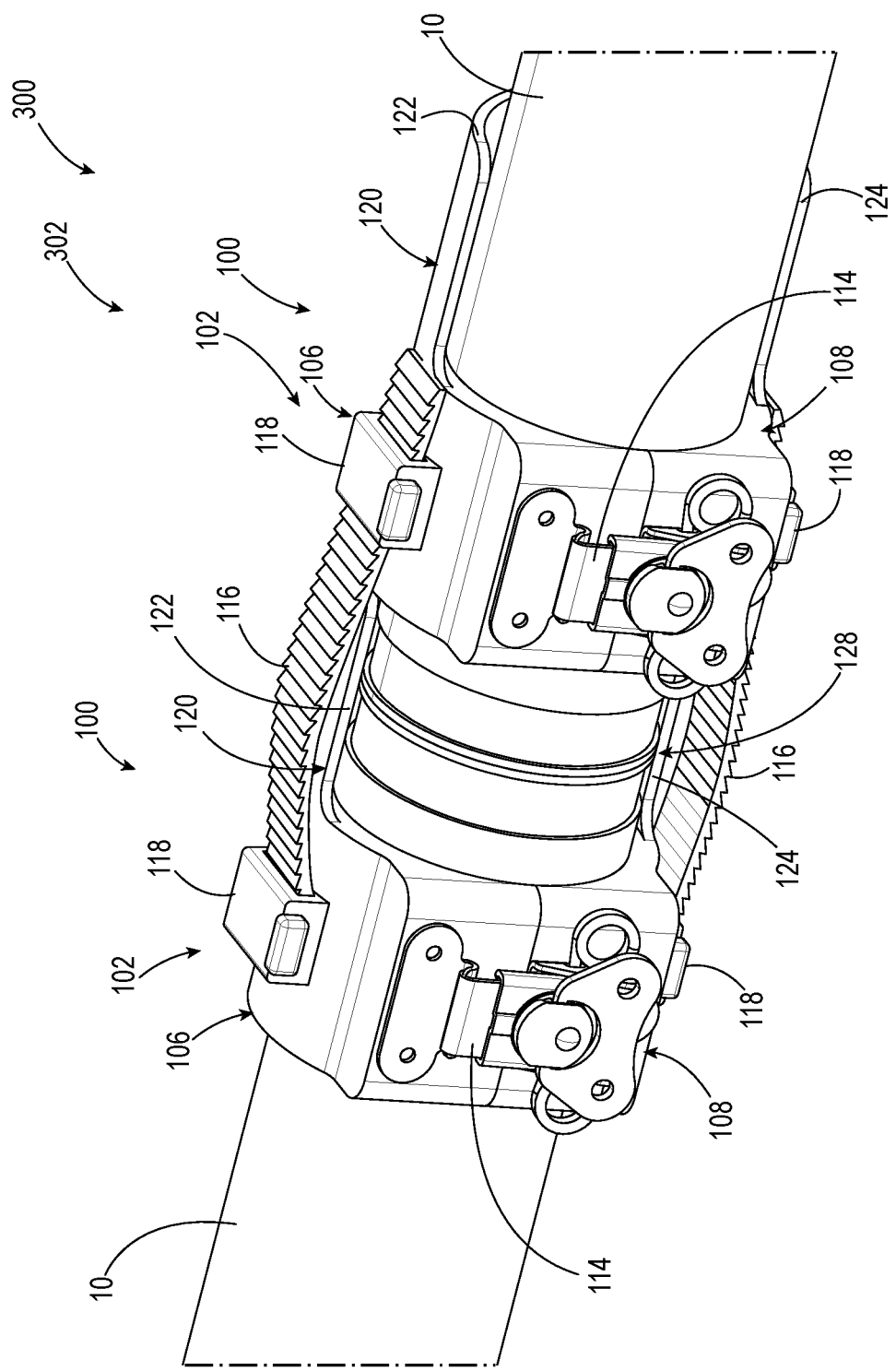
FIG. 7 is a perspective view of the conduit coupling devices of FIG. 3 shown attached to the two conduits of FIG. 6 and positioned with the two conduits engaged with each other.
Figure 8:
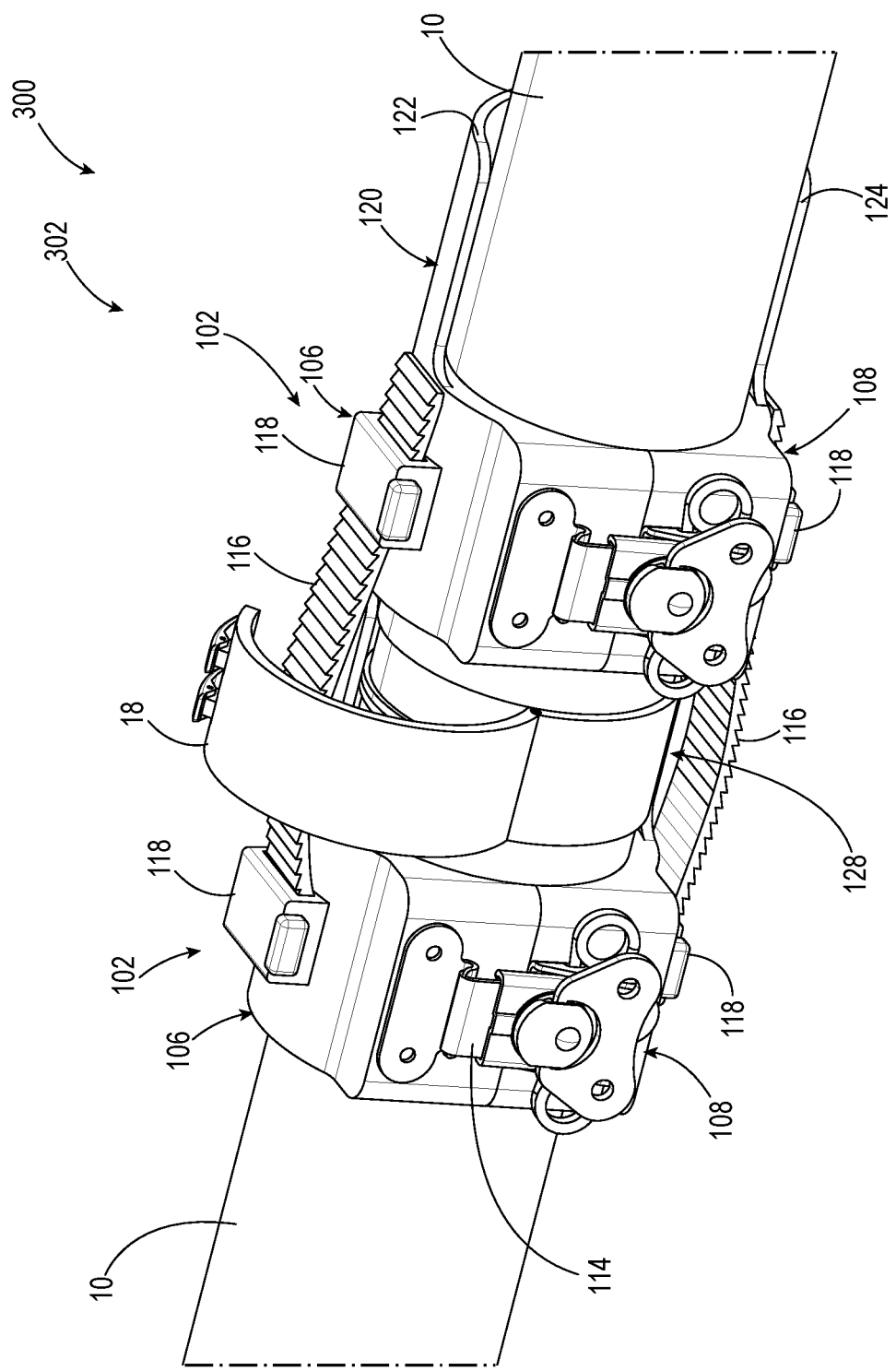
FIG. 8 is a perspective view of the assembly of FIG. 7 shown with an example clamp in a position to be operatively secured to the two conduits.
Figure 9:
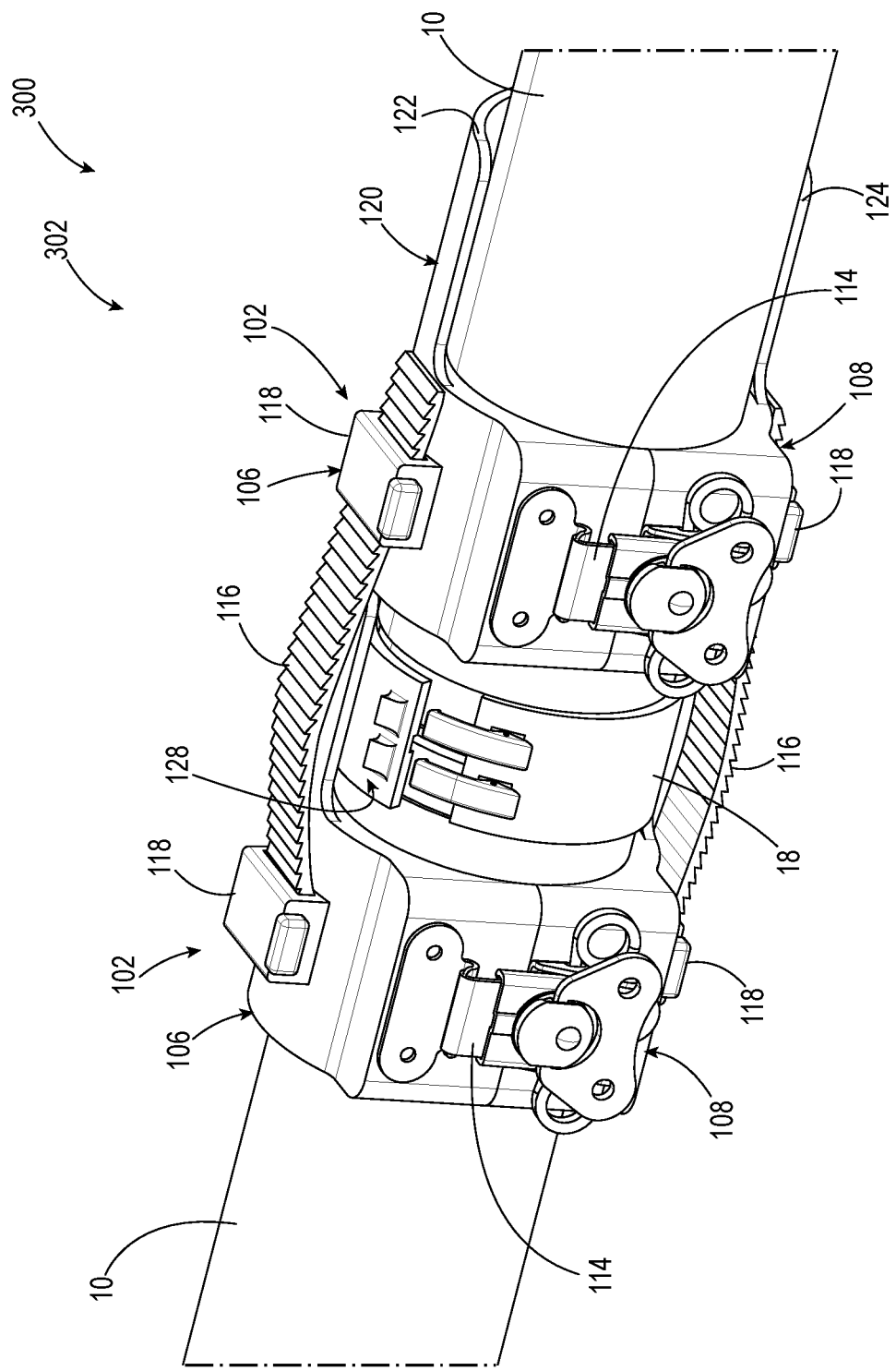
FIG. 9 is a perspective view of the assembly of FIG. 7 shown with the example clamp of FIG. 8 in a further position to be operatively secured to the two conduits.

Once the two conduit coupling devices 100 and their respective conduits 10 are initially positioned and aligned, a user may then operatively insert the two ratchet straps 116 into the corresponding ratchet buckle 118 of the second conduit couple device 100, as illustrated in FIG. 6. Next, as illustrated in FIG. 7, a user may translate the two conduits 10 (and thus the bodies 102 of the two conduit coupling devices 100) toward each other, with the ratchet straps 116 operatively translating through the respective ratchet buckles 118 until the end faces 26 of the conduits 10 engage each other. Next, as illustrated in FIGS. 8-9, a clamp 18 may be operatively positioned around the two conduits 10, by inserting the clamp 18 between the conduits 10 and the extensions 120 of one of the two conduit coupling devices 100 (i.e., the one on the left in the figures) and then rotating the clamp 18 until it is positioned fully around the conduits 10 as shown in FIG. 9. Then, the clamp 18 may be operatively secured as shown in FIG. 10.

Figure 11:
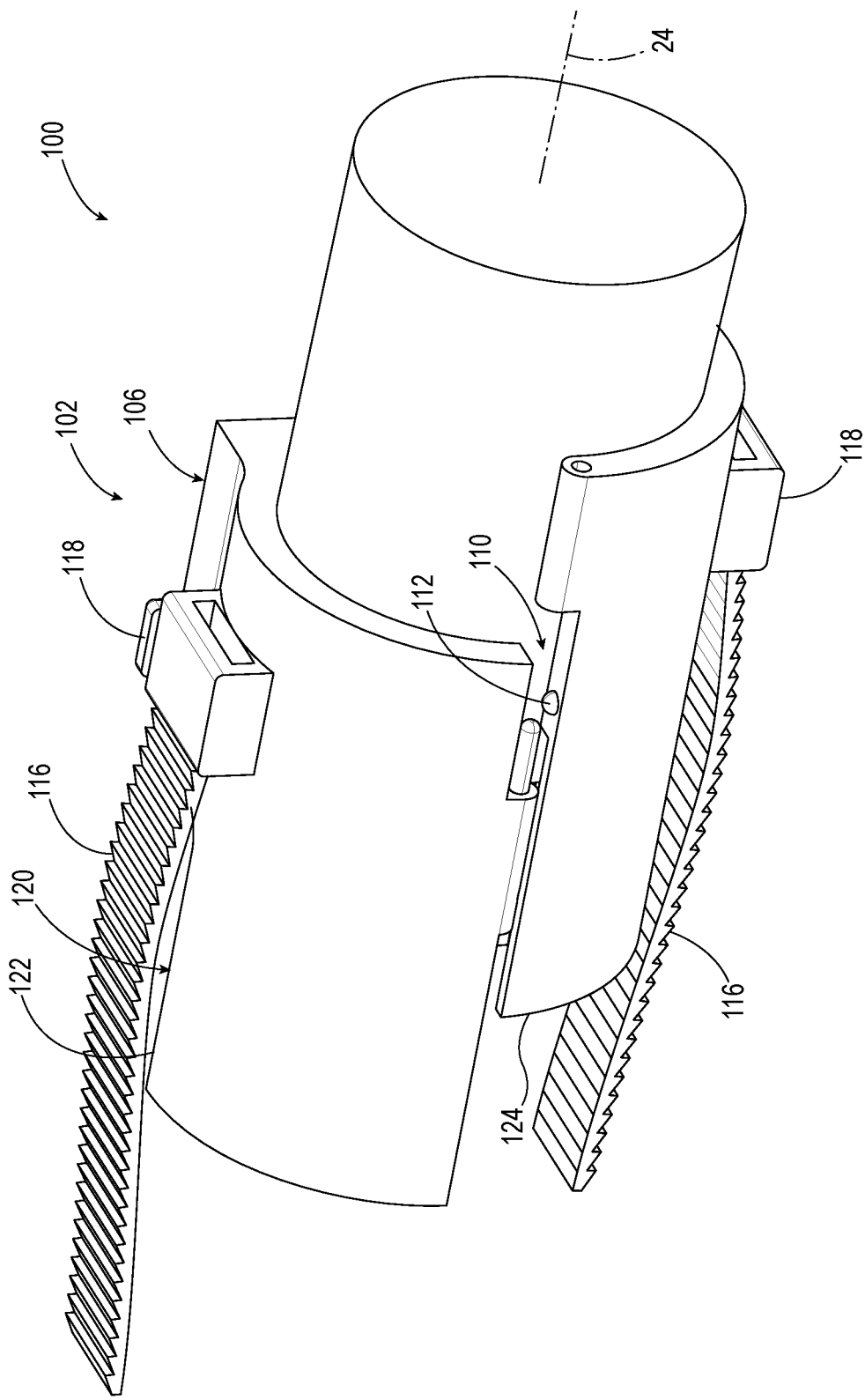
FIG. 11 is a perspective view of an example conduit coupling device being removed from a conduit.

Turning to FIG. 11, the conduit coupling devices 100 of system 302 are examples of conduit coupling devices 100 whose bodies 102 comprise a detent 112 and whose hinges 110 are configured to permit for the selective translation of the first portion 106 relative to the second portion 108 along the longitudinal axes 24 of the conduits 10. Accordingly, with reference back to FIG. 5, the conduit coupling devices 100 of system 302 may be removed from the conduits 10 when adjacent to structures that otherwise restrict the pivotal opening of the bodies 102 about their respective hinges 110.

Figure 12:
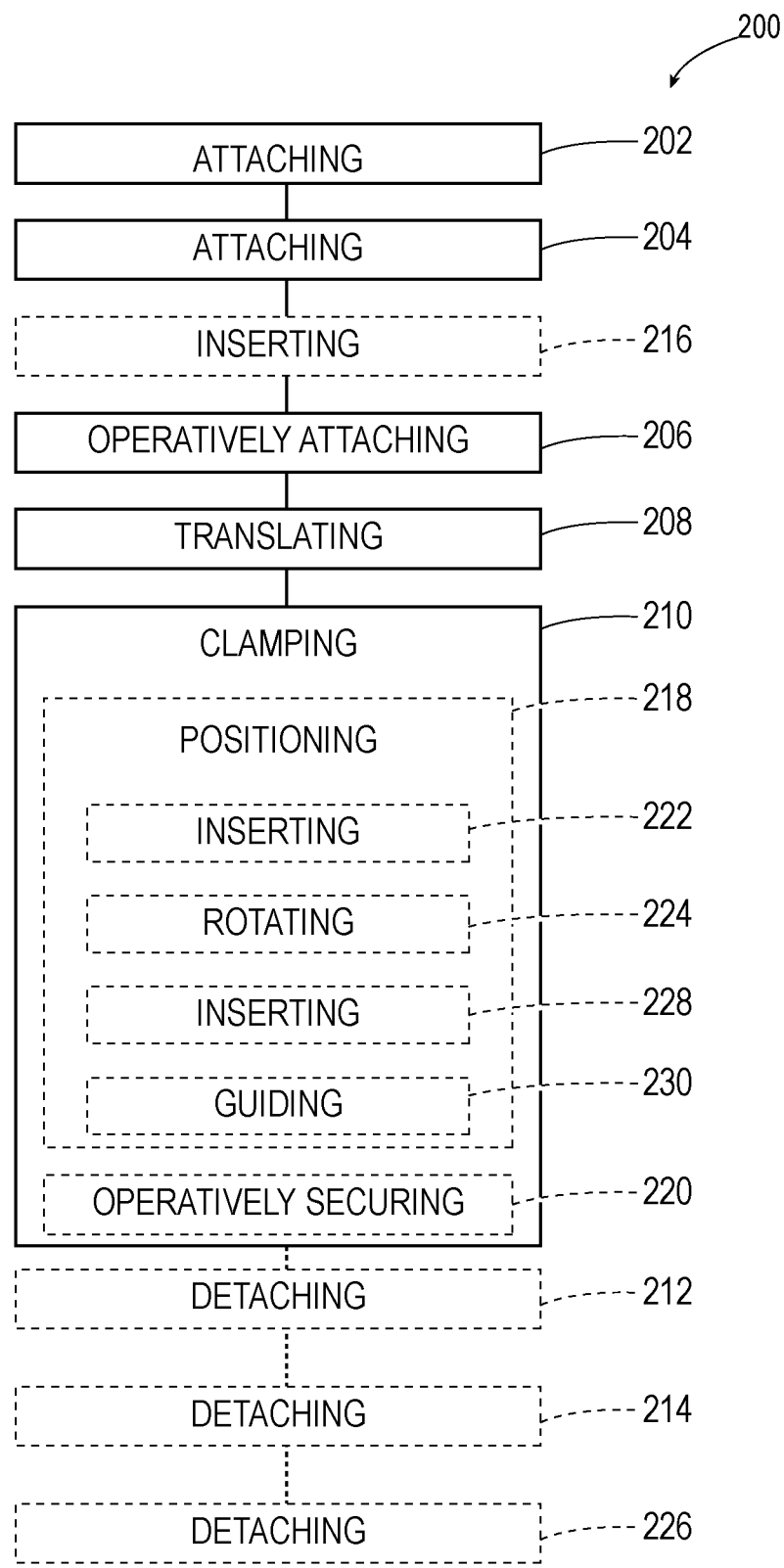
FIG. 12 is a flow chart schematically representing methods of coupling conduits.

FIG. 12 schematically provides a flowchart that represents illustrative, non-exclusive examples of methods 200 according to the present disclosure. In FIG. 12, some steps are illustrated in dashed boxes indicating that such steps may be optional or may correspond to an optional version of a method 200 according to the present disclosure. That said, not all methods according to the present disclosure are required to include the steps illustrated in solid boxes. The methods and steps illustrated in FIG. 12 are not limiting and other methods and steps are within the scope of the present disclosure, including methods having greater than or fewer than the number of steps illustrated, as understood from the discussions herein. In the following discussion, reference numerals from FIGS. 1-11 are utilized; however, the disclosed methods 200 are not limited to being implemented solely with the conduit coupling devices 100 and the systems 300 disclosed herein.

Figure 10:
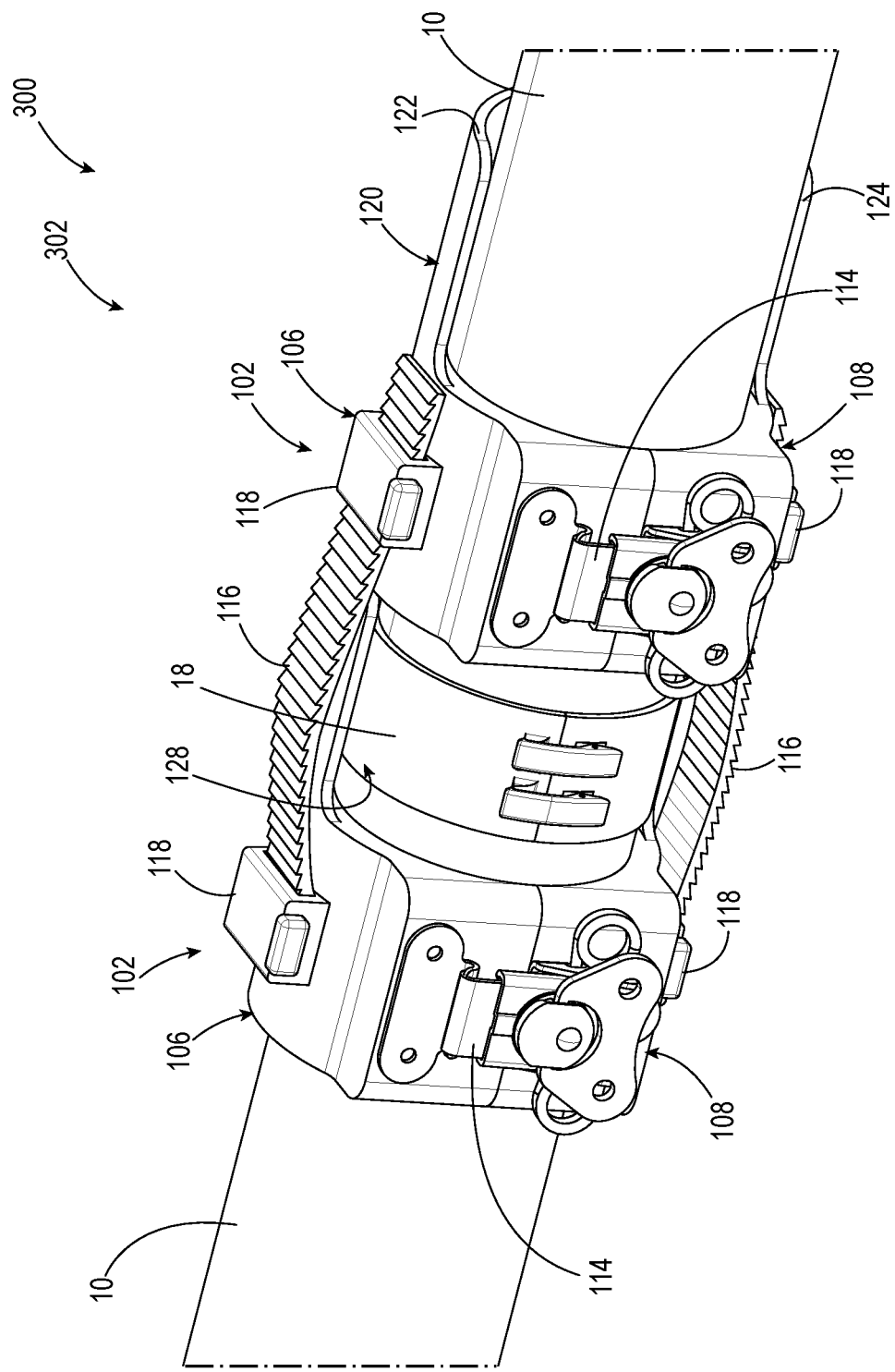
FIG. 10 is a perspective view of the assembly of FIG. 7 shown with the example clamp of FIG. 8 secured to the two conduits.

With reference to FIG. 12, methods 200 of coupling conduits 10 generally comprise at least attaching 202 a first conduit coupling device 100 to a first conduit 10 (e.g., see FIGS. 3-4); attaching 204 a second conduit coupling device 100 to a second conduit 10 (e.g., see FIGS. 3-4); operatively attaching 206 the first conduit coupling device 100 to the second conduit coupling device 100 (e.g., see FIG. 6); translating 208 the first conduit coupling device 100 and the second conduit coupling device 100 toward each other to operatively position the first conduit 10 relative to the second conduit 10 (e.g., see FIGS. 6-7); and clamping 210 the first conduit 10 to the second conduit 10 (e.g., see FIG. 8-10).

Some methods 200 further comprise, following the clamping 210, detaching 212 the first conduit coupling device 100 from the first conduit 10 and detaching 214 the second conduit coupling device 100 from the second conduit 10 (e.g., see FIG. 11).

Some methods 200 further comprise, following the attaching 202 and the attaching 204 and prior to the operatively attaching 206, inserting 216 the first conduit 10 with the first conduit coupling device 100 and the second conduit 10 with the second conduit coupling device 100 into a confined space 12. In some such methods, the confined space 12 is a wingbox 14 of an aircraft 16 (e.g., see FIG. 5).

In some methods 200, each of the operatively attaching 206, the translating 208, and the clamping 210 is implemented via a single hand of an individual.

In some methods 200, the clamping 210 comprises positioning 218 a clamp 18 around the first conduit 10 and the second conduit 10, operatively securing 220 the clamp 18 to the first conduit 10 and the second conduit 10 (e.g., see FIGS. 8-10). In some such methods 200, the positioning 218 comprises inserting 222 the clamp 18 between the first conduit 10 or the second conduit 10 and a portion of the first conduit coupling device 100 or the second conduit coupling device 100, and rotating 224 the clamp 18 around the first conduit 10 of the second conduit 10 (e.g., see FIGS. 8-10). Additionally or alternatively, in some methods 200, the positioning 218 comprises inserting 228 a hinged clamp 18 between the first conduit 10 or the second conduit 10 and an extension 120 of the first conduit coupling device 100 that defines a channel 128 between the extension 120 and the first conduit 10 or the second conduit 10, and guiding 230 the hinged clamp 18 through the channel 128 to circumscribe the first conduit 10 or the second conduit 10 with the hinged clamp 18 (e.g., see FIGS. 8-10).

Some methods 200 further comprise detaching 226 the first conduit coupling device 100 from the second conduit decoupling device 100.

In some methods 200, the first conduit 10 and the second conduit 10 are fuel lines 20.

In some methods 200, the first conduit coupling device 100 and the second conduit coupling device 100 each comprise a conduit coupling device 100 as disclosed herein in connection with FIGS. 2-11.

Illustrative, non-exclusive examples of inventive subject matter according to the present disclosure are described in the following enumerated paragraphs:

A. A conduit coupling device (100), comprising:
a body (102) configured to selectively engage an outer surface (22) of a conduit (10); and
an elongate connecting member (104) extending from the body (102) or configured to selectively extend from the body (102), wherein the elongate connecting member (104) is configured to be selectively attached to a second conduit coupling device (150) to facilitate alignment of the body (102) and the second conduit coupling device (150).

A1. The conduit coupling device (100) of paragraph A, wherein the body (102) comprises:
a first portion (106); and
a second portion (108) configured to be selectively moved relative to the first portion (106) to engage the outer surface (22) of the conduit (10).

A1.1. The conduit coupling device (100) of paragraph A1, wherein the second portion (108) is hinged to the first portion (106).

A1.1.1. The conduit coupling device (100) of paragraph A1.1, wherein the first portion (106) and the second portion (108) collectively define a hinge (110), and wherein the hinge (110) is configured to permit for the selective separation of the first portion (106) and the second portion (108).

A1.1.1.1. The conduit coupling device (100) of paragraph A1.1.1, wherein the first portion (106) or the second portion (108) defines a detent (112) configured to resist and permit separation of the first portion (106) and the second portion (108).

A1.2. The conduit coupling device (100) of any of paragraphs A1-A1.1.1.1, further comprising:
a clasp (114) configured to operatively secure the first portion (106) to the second portion (108) and to selectively restrict movement of the second portion (108) relative to the first portion (106).

A2. The conduit coupling device (100) of any of paragraphs A-A1.2, wherein the elongate connecting member (104) is configured to be selectively translated relative to the body (102).

A3. The conduit coupling device (100) of any of paragraphs A-A2, wherein the elongate connecting member (104) comprises a ratchet strap (116), and wherein the body (102) comprises a ratchet buckle (118) that is configured to operatively receive the ratchet strap (116) and to selectively restrict and selectively permit translation of the ratchet strap (116) through the ratchet buckle (118).

A4. The conduit coupling device (100) of any of paragraphs A-A3, wherein the elongate connecting member (104) is a first elongate connecting member (104), and wherein the conduit coupling device (100) further comprises:

a second elongate connecting member (104) extending from the body (102) or configured to selectively extend from the body (102), wherein the second elongate connecting member (104) is configured to be selectively attached to the second conduit coupling device (150) to facilitate alignment of the body (102) and the second conduit coupling device (150).

A4.1. The conduit coupling device (100) of paragraph A4 when depending from paragraph A1, wherein the first elongate connecting member (104) extends from the first portion (106) of the body (102) or is configured to selectively extend from the first portion (106) of the body (102), and wherein the second elongate connecting member (104) extends from the second portion (108) of the body (102) or is configured to selectively extend from the second portion (108) of the body (102).

A4.1.1. The conduit coupling device (100) of paragraph A4.1 when depending from paragraph A3, wherein the ratchet strap (116) is a first ratchet strap (116), wherein the second elongate connecting member (104) comprises a second ratchet strap (116), wherein the ratchet buckle (118) is a first ratchet buckle (118), wherein the first portion (106) of the body (102) comprises the first ratchet buckle (118), and wherein the second portion (108) of the body (102) comprises a second ratchet buckle (118) that is configured to operatively receive the second ratchet strap (116) and to selectively restrict and selectively permit translation of the second ratchet strap (116) through the second ratchet buckle (118).

A5. The conduit coupling device (100) of any of paragraphs A-A4.1.1, further comprising:

an extension (120) extending from the body (102) and configured to extend only partially around and spaced-apart from the outer surface (22) of the conduit (10) when the body (102) is operatively attached to the outer surface (22) of the conduit (10).

A5.1. The conduit coupling device (100) of paragraph A5 when depending from paragraph A1, wherein the extension (120) comprises an extension first portion (122) extending from the first portion (106) of the body (102) and an extension second portion (124) extending from the second portion (108) of the body (102).

A6. The conduit coupling device (100) of any of paragraphs A-A5.1, wherein the body (102) comprises one or more pads (126) configured to engage the outer surface (22) of the conduit (10) to restrict translation of the body (102) relative to the outer surface (22) of the conduit (10) when the body (102) is operatively attached to the outer surface (22) of the conduit (10).

B. A system (300) for coupling conduits (10) together, the system (300) comprising:

at least two of the conduit coupling devices (100) of any of paragraphs A-A6.

B1. The system (300) of paragraph B, further comprising: a clamp (18).

C. A method (200) of coupling conduits (10), the method (200) comprising:

attaching (202) a first conduit coupling device (100) to a first conduit (10);

attaching (204) a second conduit coupling device (100) to a second conduit (10);

operatively attaching (206) the first conduit coupling device (100) to the second conduit coupling device (100);

translating (208) the first conduit coupling device (100) and the second conduit coupling device (100) toward each other to operatively position the first conduit (10) relative to the second conduit (10); and clamping (210) the first conduit (10) to the second conduit (10).

C1. The method (200) of paragraph C, further comprising:

following the clamping (210), detaching (212) the first conduit coupling device (100) from the first conduit (10) and detaching (214) the second conduit coupling device (100) from the second conduit (10).

C2. The method (200) of any of paragraphs C-C1, further comprising:

following the attaching (202) the first conduit coupling device (100) to the first conduit (10) and the attaching (204) the second conduit coupling device (100) to the second conduit (10) and prior to the operatively attaching (206), inserting (216) the first conduit (10) with the first conduit coupling device (100) and the second conduit (10) with the second conduit coupling device (100) into a confined space (12).

C2.1. The method (200) of paragraph C2, wherein the confined space (12) is a wingbox (14) of an aircraft (16).

C3. The method (200) of any of paragraphs C-C2.1, wherein each of the operatively attaching (206), the translating (208), and the clamping (210) is implemented via a single hand of an individual.

C4. The method (200) of any of paragraphs C-C3, wherein the clamping (210) comprises:

positioning (218) a clamp (18) around the first conduit (10) and the second conduit (10); and operatively securing (220) the clamp (18) to the first conduit (10) and the second conduit (10).

C4.1. The method (200) of paragraph C4, wherein the positioning (218) comprises:

inserting (222) the clamp (18) between the first conduit (10) or the second conduit (10) and a portion of the first conduit coupling device (100) or the second conduit coupling device (100); and rotating (224) the clamp (18) around the first conduit (10) or the second conduit (10).

C4.2. The method (200) of any of paragraphs C4-C4.1, wherein the positioning (218) comprises:

inserting (228) a hinged clamp (18) between the first conduit (10) or the second conduit (10) and an extension (120) of the first conduit coupling device (100) that defines a channel (128) between the extension (120) and the first conduit (10) or the second conduit (10); and guiding (230) the hinged clamp (18) through the channel (128) to circumscribe the first conduit (10) or the second conduit (10) with the hinged clamp (18).

C5. The method (200) of any of paragraphs C-C4.2, further comprising:

detaching (226) the first conduit coupling device (100) from the second conduit decoupling device (100).

C6. The method (200) of any of paragraphs C-C5, wherein the first conduit (10) and the second conduit (10) are fuel lines (20).

C7. The method (200) of any of paragraphs C-C6, wherein the first conduit coupling device (100) and the second conduit coupling device (100) each comprise the conduit coupling device (100) of any of paragraphs A-A6.

D. The use of the conduit coupling device (100) of any of paragraphs A-A6 for coupling conduits (10) together.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A conduit coupling device, comprising:
    a body configured to selectively engage an outer surface of a conduit; and
    an elongate connecting member extending from the body or configured to selectively extend from the body, wherein the elongate connecting member is configured to be selectively attached to a second conduit coupling device to facilitate alignment of the body and the second conduit coupling device;
    wherein the elongate connecting member comprises a ratchet strap, and wherein the body comprises a ratchet buckle that is configured to operatively receive the ratchet strap and to selectively restrict and selectively permit translation of the ratchet strap through the ratchet buckle.

2. The conduit coupling device of claim 1, wherein the body comprises:
    a first portion; and
    a second portion configured to be selectively moved relative to the first portion to engage the outer surface of the conduit.

3. The conduit coupling device of claim 2, wherein the second portion is hinged to the first portion.

4. The conduit coupling device of claim 3, wherein the first portion and the second portion collectively define a hinge, and wherein the hinge is configured to permit for selective separation of the first portion and the second portion.

5. The conduit coupling device of claim 4, wherein the first portion or the second portion defines a detent configured to resist and permit separation of the first portion and the second portion.

6. The conduit coupling device of claim 2, further comprising:
    a clasp configured to operatively secure the first portion to the second portion and to selectively restrict movement of the second portion relative to the first portion.

7. The conduit coupling device of claim 1, wherein the elongate connecting member is configured to be selectively translated relative to the body.

8. The conduit coupling device of claim 1, wherein the elongate connecting member is a first elongate connecting member, and wherein the conduit coupling device further comprises:
    a second elongate connecting member extending from the body or configured to selectively extend from the body, wherein the second elongate connecting member is configured to be selectively attached to the second conduit coupling device to facilitate alignment of the body and the second conduit coupling device.

9. The conduit coupling device of claim 8,
    wherein the body comprises:
        a first portion; and
        a second portion configured to be selectively moved relative to the first portion to engage the outer surface of the conduit; and
    wherein the first elongate connecting member extends from the first portion of the body or is configured to selectively extend from the first portion of the body, and wherein the second elongate connecting member extends from the second portion of the body or is configured to selectively extend from the second portion of the body.

10. The conduit coupling device of claim 9,
    wherein the ratchet strap is a first ratchet strap and the ratchet buckle is a first ratchet buckle; and
    wherein the second elongate connecting member comprises a second ratchet strap, and wherein the second portion of the body comprises a second ratchet buckle that is configured to operatively receive the second ratchet strap and to selectively restrict and selectively permit translation of the second ratchet strap through the second ratchet buckle.

11. The conduit coupling device of claim 1, further comprising:
an extension extending from the body and configured to extend only partially around and spaced-apart from the outer surface of the conduit when the body is operatively attached to the outer surface of the conduit.

12. The conduit coupling device of claim 11,
wherein the body comprises:
a first portion; and
a second portion configured to be selectively moved relative to the first portion to engage the outer surface of the conduit; and
wherein the extension comprises an extension first portion extending from the first portion of the body and an extension second portion extending from the second portion of the body.

13. The conduit coupling device of claim 1, wherein the body comprises one or more pads configured to engage the outer surface of the conduit to restrict translation of the body relative to the outer surface of the conduit when the body is operatively attached to the outer surface of the conduit.

14. A system for coupling conduits together, the system comprising:
at least two of the conduit coupling devices of claim 1.

15. The system of claim 14, further comprising:
a clamp.

16. A method of coupling conduits, the method comprising:
attaching a first conduit coupling device to a first conduit;
attaching a second conduit coupling device to a second conduit;
operatively attaching the first conduit coupling device to the second conduit coupling device;
following the attaching the first conduit coupling device to the first conduit and the attaching the second conduit coupling device to the second conduit and prior to the operatively attaching, inserting the first conduit with the first conduit coupling device and the second conduit with the second conduit coupling device into a confined space;
translating the first conduit coupling device and the second conduit coupling device toward each other to operatively position the first conduit relative to the second conduit; and
clamping the first conduit to the second conduit.

17. The method of claim 16, wherein each of the operatively attaching, the translating, and the clamping is implemented via a single hand of an individual.

18. The method of claim 16,
wherein the clamping comprises:
inserting a hinged clamp between the first conduit or the second conduit and an extension of the first conduit coupling device that defines a channel between the extension and the first conduit or the second conduit;
guiding the hinged clamp through the channel to circumscribe the first conduit or the second conduit with the hinged clamp; and
operatively securing the clamp to the first conduit and the second conduit.

19. A conduit coupling device, comprising:
a body configured to selectively engage an outer surface of a conduit, wherein the body comprises a first portion and a second portion hinged to the first portion and configured to be selectively moved relative to the first portion to engage the outer surface of the conduit, wherein the first portion and the second portion collectively define a hinge, wherein the hinge is configured to permit for selective separation of the first portion and the second portion, wherein the first portion or the second portion defines a detent configured to resist and permit separation of the first portion and the second portion; and
an elongate connecting member extending from the body or configured to selectively extend from the body, wherein the elongate connecting member is configured to be selectively attached to a second conduit coupling device to facilitate alignment of the body and the second conduit coupling device.

20. A conduit coupling device, comprising:
a body configured to selectively engage an outer surface of a conduit, wherein the body comprises one or more pads configured to engage the outer surface of the conduit to restrict translation of the body relative to the outer surface of the conduit when the body is operatively attached to the outer surface of the conduit; and
an elongate connecting member extending from the body or configured to selectively extend from the body, wherein the elongate connecting member is configured to be selectively attached to a second conduit coupling device to facilitate alignment of the body and the second conduit coupling device.

21. A method of coupling conduits, the method comprising:
attaching a first conduit coupling device to a first conduit;
attaching a second conduit coupling device to a second conduit;
operatively attaching the first conduit coupling device to the second conduit coupling device;
translating the first conduit coupling device and the second conduit coupling device toward each other to operatively position the first conduit relative to the second conduit; and
clamping the first conduit to the second conduit;
wherein each of the operatively attaching, the translating, and the clamping is implemented via a single hand of an individual.

* * * * *